United States Patent [19]

Okabe et al.

[11] Patent Number: 4,634,829

[45] Date of Patent: Jan. 6, 1987

[54] CONTROL METHOD OF SPOT WELDING

[75] Inventors: Yoshio Okabe; Masato Furudate, both of Kanagawa, Japan

[73] Assignee: Dengensha Manufacturing Company Limited, Kanagawa, Japan

[21] Appl. No.: 778,454

[22] Filed: Sep. 20, 1985

[30] Foreign Application Priority Data

Sep. 21, 1984 [JP] Japan ................................ 59-199249

[51] Int. Cl.$^4$ ............................................ B23K 11/24
[52] U.S. Cl. .................................. 219/117.1; 219/110
[58] Field of Search ...................... 219/109, 110, 117.1

[56] References Cited

U.S. PATENT DOCUMENTS 3,546,421 12/1970 Meyer et al. .......................... 219/110
4,024,371 5/1977 Drake ................................... 219/110
4,343,980 8/1982 Stanya et al. ......................... 219/109

Primary Examiner—Clifford C. Shaw

Attorney, Agent, or Firm—Sughrue, Mion, Zinn, Macpeak and Seas

[57] ABSTRACT

A spot welding control method is disclosed wherein the welding current and welding time are controlled, in response to changes in the shape of the point of the electrode tip. At each weld point, the lowest value of the varying resistance between the electrode tips is detected in an initial welding period, and each detected lowest value is successively held and stored. At each weld point, a running average of the lowest resistance values is computed, bases on the resistance date of a group of weld points composed of the weld point just completed through a number of preceding weld points, the number of which is preset. The weld conditions are changed from one set of predetermined parameters to another when the computed average reaches the then prevailing threshold limit, following which the threshold is reset. The thresholds are preset depending upon the degree of wear of the electrode tip, whereby welding is continued under newly-selected weld conditions corresponding to the present threshold.

1 Claim, 4 Drawing Figures

CONTROL METHOD OF SPOT WELDING

BACKGROUND OF THE INVENTION

1. Field of the Invention

This invention relates to spot welding and, more particularly, to a method of controlling various weld conditions during spot welding, such as welding current and resistance welding time, depending upon the degree of wear of the electrode tip.

2. Description of the Prior Art

In a spot welder, as the welding working time increases, the point of the electrode tip gradually swells and its end shape is slowly deformed to increase the area of the tip point due to the strong pressing force, heating, etc. at the time of welding. Weldability is influenced directly by such deformation.

In view of this circumstance, in order to provide a good welding quality it is necessary in general to dress the point of the electrode tip or to periodically replace the tip with a new one to elongate the interval between maintenance work, in the prior art, a compensation operation was performed to compensate for the change in shape of the point of the electrode tip, through the use of a so-called current stepper control system, wherein, in accordance with the estimated degree of progressive wear of the electrode tip, the welding current is discretely increased each time a given number of welding operations is performed. Alternatively, a linear current stepper control system has been used wherein the welding current is progressively increased each time of welding.

In the present-day multiproduct-mixed production line handling galvanized sheet iron, polished soft steel plate, etc. and using of a number of welding robots, however, it is necessary to perform welding of various different materials. At the time of spot-welding galvanized sheet iron, a large current is required, and staining or wear of the electrode tips is heavier in comparison with the case of processing bare steel plate; thus the interval of tip shaping and exchange becomes correspondingly short. From the view point of productivity, such time-consuming incidental work becomes non-ignorable, and the compensation function attained via the current stepper control system or the linear current stepper control system was not satisfactorily under such circumstances. The conventional systems caused a number of problems (described below); thus other countermeasures were sought out.

Describing in detail the conventional techniques, neither the current stepper control system or the linear current stepper control system can calculate the proper rate of current increase and supply a corresponding welding power each time a different metal is subjected to welding in a multiproduct-mixed production line. Conventionally, only the number of instances of welding (the welding count) is employed as a parameter for compensation, and is used to provide a measure of the estimated welding quality. That is, the conventional systems do not suggest the control of the current increase in relation to the actual degree of wear of the electrode tip, and the rate of current increase does not necessarily agree with or correspond to the actual degree of wear of the electrode tip.

Therefore, in the prior art, the value of the current was generally set using a slightly higher rate of current increase for the sake of weld quality, so that there was the inconvenience that welding under such conditions promoted wear of the electrode tip and the frequency of dressing the electrode tip and tip exchange increased.

In addition, for the purpose of obtaining a proper rate of current increase, it was very difficult in the prior art to confirm, through experimentation, the extent of wear appearing on the electrode tip in relation to the number of successive welds performed by that tip.

SUMMARY OF THE INVENTION

It is an object of the present invention to provide a spot welding control method which is not based on a process of estimating the degree of wear of the electrode tip through experimentation as in the prior art. The inventive system detects a change in the extent of wear of the electrode tip at each weld point in the course of multiproduct-mixed production line spot welding, where the degree of wear of the electrode tip differs from weld to weld. Welding current is supplied on the basis of the detected change at an optimal current ratio and/or for an optimal welding time, whereby the interval of dressing the electrode tip and tip exchange is elongated. The productivity of the production line, even one of the multiproduct-mixed type, is improved.

DESCRIPTION OF THE PREFERRED EMBODIMENT

An adaptive control method according to the present invention will now be described in detail with reference to the drawings.

Figure 1:
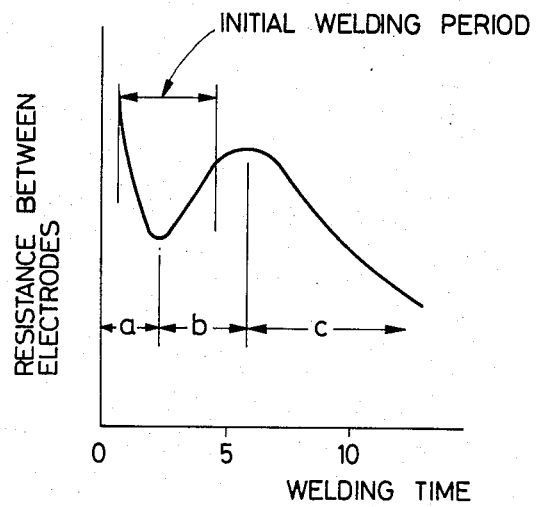
FIG. 1 is a waveform diagram showing the change of resistance between electrode tips during the course of welding.

As is well known in the art, when the welding current is normal, the resistance between the electrode tips during the course of welding changes as shown typically in FIG. 1. Period a indicated in this drawing is an unstable region immediately after the start of the conduction of welding, during which the behavior of the resistance between the electrode tips depends upon the state of contact (fit) with the work and the condition of stains on the surface of the work, such as oil and rust. The surface contact resistance disappears within one to two cycles (see the horizontal axis "WELDING TIME") after the start of conduction and resistance between the electrode tips decreases steeply. In period b, there progress concurrently an increase of intrinsic resistance across the electrodes due to temperature rise at the weld portion and an enlargement of the area of the conducting path due to softening and collapsing of the weld portion. During the above process the increase of resistance between the tips due to temperature rise overcomes the decrease of resistance due to the enlargement of area of the conducting path. As a result, the total resistance between the electrode tips increases and assumes the maximum value at a moment close to the end of this period. In the period b, a nugget appears and grows through its initial stage.

In period c, the area of the conducting path continues to expand with the growth of the nugget; but the resistance between the electrode tips decreases because the rising temperature of the work reaches a saturation value and is kept substantially constant.

As each electrode tip is subjected to repetitive spot welding, the point area of the electrode tip expands gradually, so that the contact resistance decreases. On the other hand, the diameter of the conducting path inside the work expands also, so that the resistance between the electrode tips decreases.

Accordingly, it is possible to state that the lowest value of the resistance between the electrode tips within four to five cycles after the start of conduction is proportional in general to the extent of enlargement in diameter of the point of the electrode tip, i.e. the extent of wear of the electrode tip.

The present control method detects at each weld point only the lowest value of the varying resistance between the electrode tips, stores and holds each detected lowest value successively, computes at each weld point the average lowest resistance value from a set of lowest resistance values corresponding to a group of weld points composed of the weld point just completed through a predetermined number of preceding weld points, and changes weld conditions, such as welding current, from one value to another when the computed average successively reaches successive threshold levels, which thresholds are preset depending upon the degree of wear of the electrode tip, whereby welding current is supplied in accordance with the prevailing weld conditions.

Figure 2:
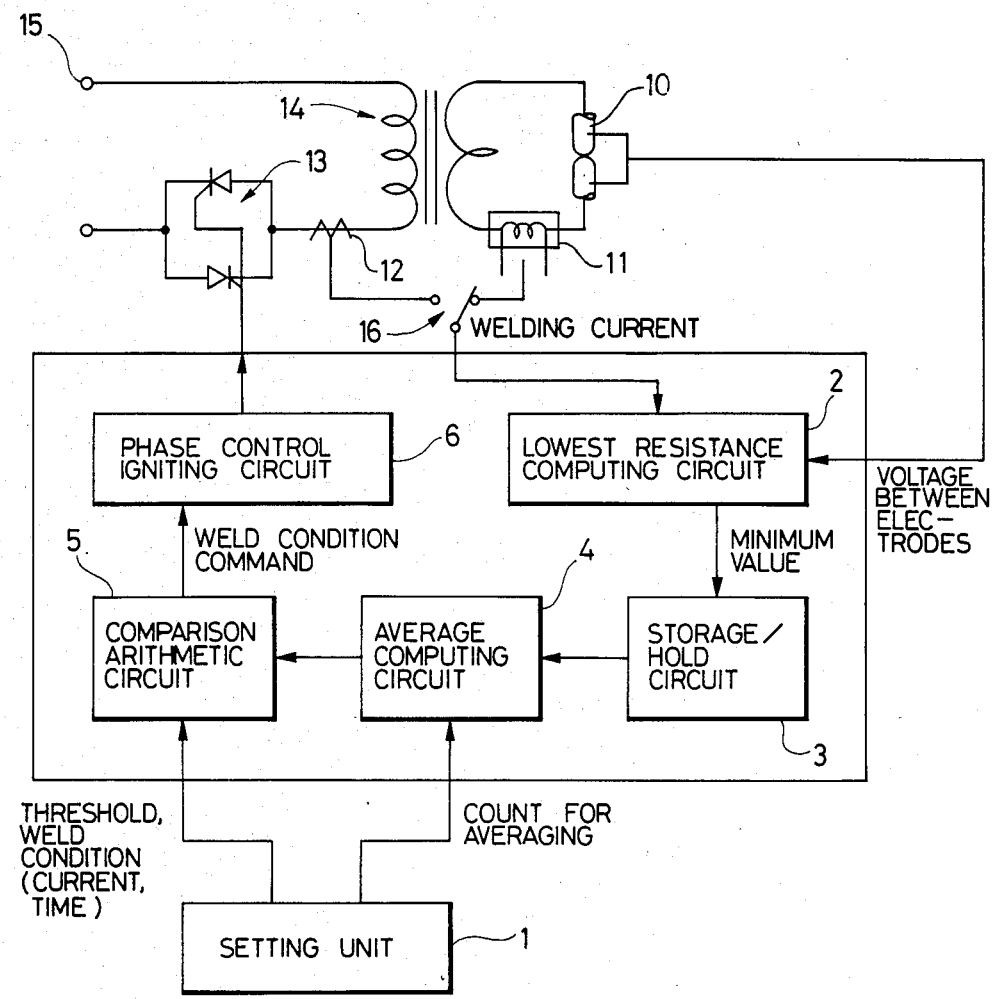
FIG. 2 is a block diagram showing an example of a system realizing a control method according to the present invention.

In practicing the present control method, a plurality of thresholds are preliminarily entered in a setting unit 1 shown in the block diagram of FIG. 2, which thresholds correspond to grades representing the degree of wear of the electrode tip 10 and determine the rate of increase of the welding current and the timing of such current increase.

Figure 3:
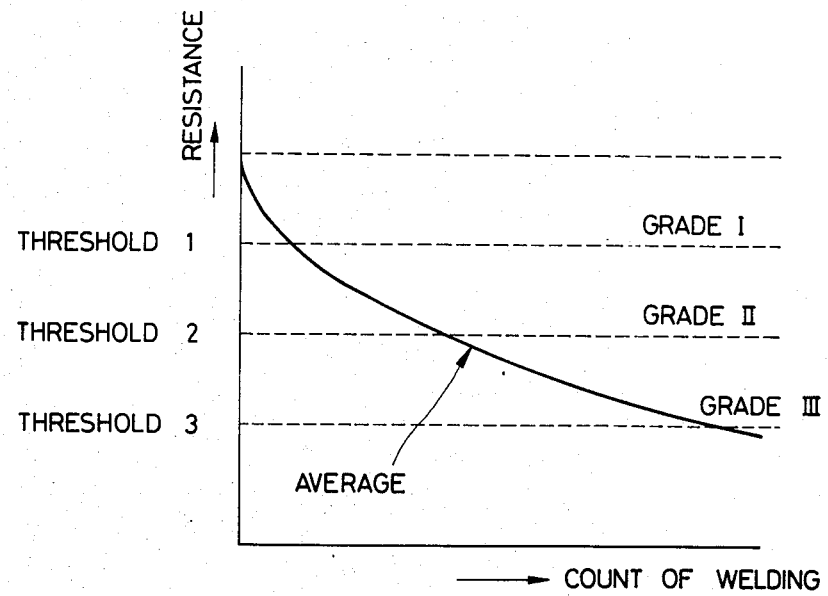
FIG. 3 is a graph showing the relation between the change of the average of the lowest resistance between electrode tips in relation to the degree of wear of the electrode tip, and a set of thresholds corresponding to grades of wear, for compensation of the quality of welding.

To obtain the thresholds, a plurality of electrode tips are prepared which bear different degrees of wear dividable into two to ten classes, for example. Through examination of theses electrode tips, the welding conditions required for a new tip through a maximally worn tip to provide a desired quality of welding are determined and classified into plural grades, and the corresponding thresholds (1~3) are set. That is, through experimentation, a plurality of data sets (welding current, welding time, etc.) related to different degrees of wear of the electrode tip are obtained in terms of respective grades (I~III), and these conditions are entered in the setting unit 1 (see FIG. 3).

In practice, the following conditions are obtained through experimentation and set in the setting unit 1:

(1) Current value and welding time before initial welding period (see FIG. 1).

It is desirable that the initial welding period extending into the initial unstable region be comparatively short.

(2) Current value and welding time after initial welding period.

One set of weld conditions should be created taking into consideration the contribution of the initial welding period to welding action.

(3) Thresholds related to grades, on the basis of which several conditions such as welding current are changed.

As described hereinabove, the degree of wear of the electrode tip ranging from the unworn state to the anticipated maximally worn state is classified into plural grades sufficient to maintain the desired quality of welding.

(4) Reference count of weld points (the reference number of welding instances) for calculation of the average lowest resistance value.

The reference count of weld points is determined so as to match the circumstances of the production line, taking into consideration mechanical factors, material, etc. of the welding gun and the work. If the resistance of one weld point only is used as the basis of control, the system becomes unstable due to unexpected disturbances. Thus, the reference count should be selected so as to obviate such instability.

Referring to FIG. 2, at first, in addition to the voltage across the electrode tips, the welding current is detected every half cycle by means of a toroidal coil 11, CT (current transformer) 12, etc. during the initial welding period extending over some number of cycles (ranging from a half cycle to ten cycles, for example), and on the basis of these detected values the resistance between the electrode tips is computed in a lowest resistance computing circuit 2 receiving these values, using the following equation:

$$\text{Resistance between electrodes} = \frac{\text{Voltage between electrodes}}{\text{Welding current}}$$

For each welding operation, only the lowest value of the resistance between the electrode tips obtained in the computing circuit 2 is held in a store/hold circuit 3.

Figure 4:
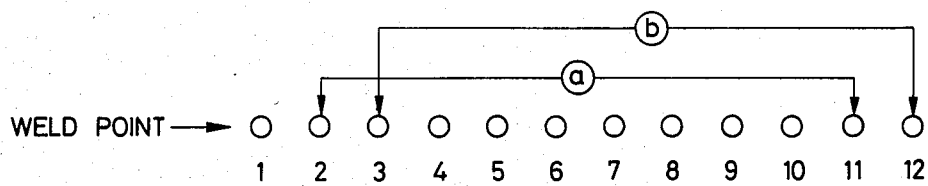
FIG. 4 is a chart showing a procedure for calculating a running average of the lowest resistance values corresponding to the weld points, the count of which is preset.

If the system is adjusted so that it can perform one to one hundred welding operations, if the welding count for averaging purposes is set to ten, for example, this count is entered in the setting unit 1 and is applied to an average computing circuit 4. This average computing circuit 4 fetches ten successive lowest values from the store/hold circuit 3 at each weld point and computes the average lowest resistance between the electrode tips. The procedure of computation of the average is as follows: In FIG. 4, if the count (the number of weld points of one group) for averaging is set to ten and the weld points are numbered "1" through "n" and if the weld point just finished is numbered "11", group a excludes the oldest weld point "1" and includes the newest weld point "11". With respect to recomposed group a the average of lowest resistance values corresponding to the weld points "2" through "11" is computed by the following equation:

$$\text{Average} = \frac{\text{Sum of lowest resistance values of group}}{\text{Count for averaging}}$$

The thus computed average resistance is treated as the lowest resistance of weld point "11".

As the subsequent weld point "12" is processed, the then oldest weld point "2" is excluded and the newest weld point "12" is included (see group b). The then computed average of lowest values corresponding to weld points "3" through "12" is used as the lowest resistance of weld point "12". In this way, in compliance with the progress of the welding operation, the oldest weld point is excluded from the group, the weld point just completed is added thereto, and the computed average of the recomposed group is used as the lowest resistance value of the latest weld point finished. By the foregoing mode of operation, the welding system is protected from the influence of an unexpected disturbance, such as an undesirable state of contact or fit of the work.

At each weld point, after the initial welding period of spot welding has elapsed, the process of welding is performed in accordance with selected weld conditions as described below. That is, with the advance of the welding process through respective weld points, a comparison arithmetic circuit 5 compares the output of the average computing circuit 4 with a preset threshold at each weld point. When the average exceeds the threshold limit, the rank of threshold is advanced by one step (i.e., a new threshold is set) by means of a command output by the comparison arithmetic circuit 5, and a thyristor 13 is controlled by means of a phase control ignition circuit 6 so that the actual welding state faithfully follows the weld conditions which have been present for the new grade just selected, whereby the proper welding is carried out.

For reference, in FIG. 2, 14 is a welding transformer, 15 is a welding source, and 16 is a switch for selecting the toroidal coil 11 or CT 12.

In the case of welding galvanized sheet iron, an alloy layer made up of copper and zinc is formed on the point of the electrode tip through repetitive welding. This layer acts as to negate the decrease in resistance between the electrode tips which appears due to wear of the electrode tip as described hereinabove. That is, although wear of the electrode tip is actually advancing, the extent of such wear seems to be less if judged only through detection of the resistance between the electrode tips. The foregoing inconvenience can be easily obviated by taking into consideration the foregoing effect at the time of determining the reference grades and corresponding weld conditions.

To manage the case wherein the electrode tip reaches the expected maximum degree of wear, or where the lowest resistance value decreases beyond the final preset threshold, it is of course possible to add means for generating a completion signal to the system, as was the case in the conventional linear current stepper and current stepper control systems.

As is apparent from the foregoing description, the present spot welding control method increases the welding current in response to a change in the shape of the point of the electrode tip without regard to material of the work. The invention can thus manage galvanized sheet iron, bare steel plate, and combinations thereof. The present control method deduces the actual state of wear of the electrode tip from the lowest value of the resistance between the electrode tips in the course of welding, and in response thereto supplies power under proper weld conditions fitted to the state of wear of the electrode tip. Thus, the present control method eliminates the need to set the weld conditions by investigating the extent of wear on the electrode tip vs. the number of instances of spot welding through experimentation done under circumstances close to the actual circumstanced of the production line, as was required in the conventional techniques. The present control method allows comparatively easy setting of the weld conditions through simple experimentation into the proper conditions corresponding to the degree of wear of the electrode tip. The present control method does not require the setting of a slightly higher than needed rate of current increase, which was required in the prior art to compensate for the anticipated fluctuation in the degree of wear of the electrode tip, and thus can achieve welding under the proper weld conditions. The present control method can elongate the interval of dressing of the electrode tip and tip exchange by employment of the proper weld conditions, thereby reducing incidental labor such as tip exchange, to improve the productivity of the mixed production line.

What is claimed is:

1. A spot welding control method for controlling welding conditions in response to changes in the shape of the points of the welding electrodes, comprising;

monitoring the electrical resistance between said welding electrodes in the course of each welding operation, to detect the minimum resistance between said electrodes at least during an initial period of each welding operation;

holding and storing successive minimum resistance values so detected;

maintaining a set of said successive minimum resistance values, said set being comprised of the most recent detected value plus a fixed predetermined number of successive previously detected values;

computing the average of said set of successive minimum resistance values;

comparing said average with a plurality of threshold values; and, each time said average reaches one of said threshold values, modifying said welding conditions to compensate for the change in said average, such that said welding conditions are maintained constant so long as said average remains between successive threshold values, said threshold values being selected in correspondence with the degree of wear of said welding electrodes.

* * * * *